US011425662B2

(12) United States Patent
Wernersson

(10) Patent No.: US 11,425,662 B2
(45) Date of Patent: Aug. 23, 2022

(54) UPLINK POWER CONTROL BASED ON MULTIPLE REFERENCE SIGNALS

(71) Applicant: Telefonaktiebolaget LM Ericsson (publ), Stockholm (SE)

(72) Inventor: Niklas Wernersson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 817 days.

(21) Appl. No.: 16/078,232

(22) PCT Filed: Mar. 14, 2018

(86) PCT No.: PCT/SE2018/050249
§ 371 (c)(1),
(2) Date: Aug. 21, 2018

(87) PCT Pub. No.: WO2018/231113
PCT Pub. Date: Dec. 20, 2018

(65) Prior Publication Data
US 2021/0219244 A1    Jul. 15, 2021

Related U.S. Application Data

(60) Provisional application No. 62/521,147, filed on Jun. 16, 2017.

(51) Int. Cl.
*H04W 52/14* (2009.01)
*H04W 52/32* (2009.01)
(Continued)

(52) U.S. Cl.
CPC ......... *H04W 52/325* (2013.01); *H04L 5/0051* (2013.01); *H04L 25/0226* (2013.01);
(Continued)

(58) Field of Classification Search
CPC .......... H04W 52/146; H04W 52/325; H04W 52/242
See application file for complete search history.

(56) References Cited

U.S. PATENT DOCUMENTS

2011/0115421 A1   5/2011   Kern et al.
2013/0040578 A1*  2/2013   Khoshnevis ........ H04W 52/242
                                                         455/67.11
(Continued)

FOREIGN PATENT DOCUMENTS

JP    2013-118619 A    6/2013
WO    2011 115421 A2   9/2011
(Continued)

OTHER PUBLICATIONS

3GPP TS 36.213 v10.13.0; Technical Specification; 3rd Generation Partnership Project; Technical Specification Group Radio Access Network; Evolved Universal Terrestrial Radio Access (E-UTRA) Physical layer procedures (Release 10)—Jun. 2015.
(Continued)

*Primary Examiner* — Hoon J Chung
(74) *Attorney, Agent, or Firm* — Baker Botts, LLP

(57) ABSTRACT

According to certain embodiments, a method implemented in a wireless device comprises determining configuration data representing a set of configurations. The method comprises receiving at least one reference signal from a transmission point. The receiving of the at least one reference signal is performed in accordance with a configuration selected from the set, wherein the configuration is related to uplink power control and is specific to an uplink channel or signal or a group thereof. The method comprises measuring a propagation-related quantity on the basis of the at least one reference signal and deriving an uplink power setting on the basis of the measured propagation-related quantity.

26 Claims, 12 Drawing Sheets

(51) Int. Cl.
*H04W 52/24* (2009.01)
*H04L 5/00* (2006.01)
*H04L 25/02* (2006.01)
*H04W 72/04* (2009.01)

(52) U.S. Cl.
CPC ....... *H04W 52/146* (2013.01); *H04W 52/242* (2013.01); *H04W 72/0446* (2013.01); *H04W 72/0453* (2013.01); *H04W 72/0493* (2013.01)

(56) References Cited

U.S. PATENT DOCUMENTS

| | | | |
|---|---|---|---|
| 2014/0086353 A1* | 3/2014 | Ni | H04B 7/0478 375/267 |
| 2020/0205085 A1* | 6/2020 | Li | H04B 7/0682 |

FOREIGN PATENT DOCUMENTS

| | | |
|---|---|---|
| WO | 2011 115421 A3 | 9/2011 |
| WO | 2012 177207 A1 | 12/2012 |
| WO | 2018 175784 A1 | 9/2018 |
| WO | 2018 232245 A1 | 12/2018 |

OTHER PUBLICATIONS

3GPP TSG RAN WG1 Meeting #88bis; Spokane, USA; Source: Huawei, HiSilicon; Title: Detailed considerations on UL power control design for NR (R1-1704228)—Apr. 3-7, 2017.

3GPP TSG RAN WG1 Meeting #89; Hangzhou, China; Source: Huawei, HiSilicon; Title: Detailed considerations on UL power control design for NR (R1-1706930)—May 15-19, 2017.

3GPP TSG RAN WG1 Meeting #89; Hangzhou, P.R. China; Source: Nokia, Alcatel-Lucent Shanghai Bell; Title: UL Power Control for Mimo (R1 -1708220)—May 15-19, 2017.

* cited by examiner

UPLINK POWER CONTROL BASED ON MULTIPLE REFERENCE SIGNALS

PRIORITY

This nonprovisional application is a U.S. National Stage Filing under 35 U.S.C. § 371 of International Patent Application Ser. No. PCT/SE2018/050249 filed Mar. 14, 2018, and entitled "Uplink Power Control Based on Multiple Reference Signals" which claims priority to U.S. Provisional Patent Application No. 62/521,147 filed Jun. 16, 2017, both of which are hereby incorporated by reference in their entirety.

TECHNICAL FIELD

Disclosed herein are methods and devices for enabling uplink power control on the basis of reference signal measurements.

BACKGROUND

1. Power Control

Setting output power levels of transmitters, base stations in downlink and mobile stations in uplink, in mobile systems is commonly referred to as power control (PC). Objectives of PC include improved capacity, coverage, improved system robustness, and reduced power consumption.

In 3GPP Long Term Evolution (LTE), PC mechanisms can be categorized in to the groups (i) open-loop, (ii) closed-loop, and (iii) combined open- and closed loop. These differ in what input is used to determine the transmit power. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets its transmit power accordingly. In a combined open- and closed-loop scheme, both inputs are used to set the transmit power.

In systems with multiple channels between the terminals and the base stations, e.g. traffic and control channels, different power control principles may be applied to the different channels. Using different principles yields more freedom in adapting the power control principle to the needs of individual channels. The drawback is increased complexity of maintaining several principles.

2. PC Loops

In LTE release 10, for instance, the user equipment (UE) is initially performing PC for the physical random access channel (PRACH) using $$P_{PRACH} = \min\{P_{CMAX,c}(i), \text{PREAMBLE\_RECEIVED\_TARGET\_POWER} + PL_c\}.$$

For details, see 3GPP TR 36.213, clause 5.1 and subclauses. After a connection has been established between the UE and the eNodeB, the UE can be configured for performing uplink (UL) PC also on physical uplink control channel (PUCCH), physical uplink shared channel (PUSCH) and sounding reference signal (SRS) transmission. Setting the UE transmit power for a PUCCH transmission is done from $$P_{PUCCH} = \min\{P_{CMAX,c}, P_{0,PUCCH} + PL_c + \nabla_{Format} + \delta\}$$

Here, $P_{PUCCH}$ is the transmit power to use in a given subframe and $PL_c$ is the pathloss estimated by the UE. For PUSCH one instead uses the equation $$P_{PUSCH,c} = \min\{P_{CMAX,c}, P_{PUCCH}, P_{0,PUSCH} + \alpha PL_c + 10\log_{10} M + \nabla_{MCS} + \delta\}$$

where c denotes the serving cell and $P_{PUSCH,c}$ is the transmit power to use in a given subframe. For SRS one defines $$P_{SRS,c}(i) = \min\{P_{CMAX,c}(i), P_{SRS\_OFFSET,c}(m) + 10\log_{10} M_{SRS,c} + P_{0,PUSCH}(j) + \alpha_c(j) \cdot PL_c + f_c(i)\}.$$

Also here, $PL_c$ contributes to the power level for the UE transmission. It is clear from this that the pathloss estimation conducted by the UE plays an important role of the PC. The pathloss must in turn be estimated from a downlink (DL) transmission and is typically done by measuring on a reference signal.

3. Beam-Specific Power Control

It is envisioned that 3GPP New Radio (NR) supports beam-specific power control, although the exact details on what beam specificity implies are not yet fully decided. Beam-specific PC may for instance be a scheme that enables use cases where separate power control in multiple UE transmit (TX) and gNB (base station in NR) receive (RX) beam pairs are maintained. Use cases include for instance A UE transmitting to a transmission point (TRP) using a certain beam switches to another beam and then consequently also switches from one PC loop to another.

A UE transmitting to a TRP switches to another TRP and then consequently also switches from one PC loop to another.

However, one should keep in mind that these kinds of use cases are primarily intended for high-band operation and it is essential to make NR UL PC work well also for low-band operation. Here a solution similar to the solution in LTE should be sufficient where non-beam-specific PC was used. Hence, there is no clear justification to design all parts of the PC framework in NR to be beam-specific.

4. RS Types

In NR, it is envisioned that there will exist several different kinds of reference signals, such as channel state information reference signal (CSI-RS), synchronization signal (SS) (e.g., primary SS, secondary SS), sounding reference signal (SRS), phase tracking reference signal (PTRS), and tracking reference signal (TRS). It is also envisioned that the PC is allowed to base its path loss estimation on a subset of those reference signals. However, it has been agreed that at least SS and CSI-RS are included in this subset. Possibly TRS will be included too. This means that PC will be carried out based on different kinds of reference signals which is a difference compared to LTE, where only CRS was used for PC for all channels. This is illustrated by the signal processing diagram in FIG. 1, where a path loss parameter $PL_c$ is measured based on CRS (step 111) and then contributes to the power settings for each of SRS, PUSCH, and PUCCH via respective calculation rules 121, 122, 123.

5. Problems with Existing Solutions

For the path loss estimation in LTE, it was possible to rely on CRS which was transmitted in a periodic and cell-specific manner. In NR, and potentially later releases of LTE, a more flexible, but also less static, reference signal framework is considered and path loss estimation for PC (and non-beam-specific PC in particular) will be based on different types of reference signals. This makes the problem of estimating the path loss-based on a reference signal more complicated.

SUMMARY

Embodiments of the present disclosure may provide solutions for performing power control based on different types of reference signals.

According to certain embodiments, a method implemented in a wireless device comprises determining configuration data representing a set of configurations. The method comprises receiving at least one reference signal from a transmission point. The receiving of the at least one reference signal is performed accordance with a configuration selected from the set, wherein the configuration is related to uplink power control and is specific to an uplink channel or signal or a group thereof. The method comprises measuring a propagation-related quantity on the basis of the at least one reference signal and deriving an uplink power setting on the basis of the measured propagation-related quantity.

In certain embodiments, the set of configurations is specific to the uplink channel or signal or group thereof.

In certain embodiments, the configuration data indicates a size of a set of reference signals in each configuration. In certain embodiments, the configuration data is received in semi-static signaling.

In certain embodiments, the method further comprises receiving first control information indicating the selected configuration in the set of configurations. In certain embodiments, the first control information is specific for an uplink channel or signal or group thereof. In certain embodiments, the first control information is received in dynamic signaling. In certain embodiments, the first control information is received in semi-static signaling.

In certain embodiments, the method further comprises receiving second control information. The second control information is related to a same time or frequency position as the first control information but is specific to a different uplink channel or signal or group thereof.

In certain embodiments, the channel or signal or group thereof is one or more of: PUSCH, PUCCH, and/or SRS.

In certain embodiments, the propagation-related quantity is one or more of path loss relative to the transmission point and/or a path loss-related quantity.

In certain embodiments, the configuration is independently selectable from the set for each time segment or each frequency segment or each time-frequency tile.

Also disclosed is a wireless device, a computer program, and a computer program product to perform any of the embodiments of the above described method implemented in a wireless device. As an example, in certain embodiments, a wireless device comprises a receiver, a transmitter, processing circuitry and a memory storing instructions executable by the processing circuitry. In certain embodiments, the wireless device is a user equipment. The instructions comprise instructions for determining configuration data representing a set of configurations and instructions for receiving at least one reference signal from a transmission point. The receiving of the at least one reference signal is performed in accordance with a configuration selected from the set, wherein the configuration is related to uplink power control and is specific to an uplink channel or signal or a group thereof. The instructions comprise instructions for measuring a propagation-related quantity on the basis of the at least one reference signal, and instructions for deriving an uplink power setting on the basis of the measured propagation-related quantity. As another example, in certain embodiments, a computer program comprises computer-readable instructions for causing a programmable processor to perform any of the embodiments of the above described method implemented in a wireless device. As another example, in certain embodiments, a computer program product comprising a computer-readable medium storing the computer program.

According to certain embodiments, a method implemented in a transmission point comprises transmitting configuration data representing a set of configurations. The set of configurations relate to uplink power control of a wireless device to be served by the transmission point. The method also comprises transmitting at least one reference signal.

In certain embodiments, the set of configurations is specific to an uplink channel or signal or group thereof.

In certain embodiments, the configuration data indicates a size of a set of reference signals in each configuration. In certain embodiments, the configuration data is transmitted in semi-static signaling.

In certain embodiments, the method further comprising transmitting first control information indicating a selected configuration in the set of configurations. In certain embodiments, the first control information is specific for an uplink channel or signal or group thereof. In certain embodiments, the first control information is transmitted in dynamic signaling. In certain embodiments, the first control information is transmitted in semi-static signaling.

In certain embodiments, the method further comprises transmitting second control information. The second control information is related to a same time or frequency position as the first control information but is specific to a different uplink channel or signal or group thereof.

In certain embodiments, the channel or signal or group thereof is one or more of PUSCH, PUCCH, and/or SRS.

In certain embodiments, the configuration is independently selectable from the set for each time segment or each frequency segment or each time-frequency tile.

Also disclosed is a transmission point, a computer program, and a computer program product to perform any of the embodiments of the above described method implemented in a transmission point. As an example, in certain embodiments, a transmission point comprises a receiver, a transmitter, processing circuitry and a memory storing instructions executable by the processing circuitry. In certain embodiments, the transmission point is a base station, such as a gNB. The instructions comprise instructions for transmitting configuration data representing a set of configurations. The set of configurations relate to uplink power control of a wireless device to be served by the transmission point. The instructions further comprise instructions for transmitting at least one reference signal. As another example, in certain embodiments, a computer program comprises computer-readable instructions for causing a programmable processor to perform any of the embodiments of the above described method implemented in a transmission point. As another example, in certain embodiments, a computer program product comprises a computer-readable medium storing the computer program.

According to certain embodiments, uplink power control may be performed according to a method in which a UE supports a limited set of options on which reference signal or set of reference signals the uplink power control pathloss estimation should be based on. Further, in certain embodiments, which option to use for uplink power control path loss estimation can be configured separately for different channels or different signals. As an example, which option to use for uplink power control path loss estimation can be configured separately for PUCCH, PUSCH, and/or SRS.

According to certain embodiments, a method implemented in a wireless device comprises receiving at least one reference signal from a transmission point, measuring a propagation-related quantity loss on the basis of the at least one reference signal, and deriving an uplink power setting on the basis of the measured propagation-related quantity. The receiving of the at least one reference signal is performed in accordance with a configuration related to uplink power control.

According to certain embodiments, a computer program comprises computer-readable instructions for causing a programmable processor to perform the method for use in a wireless device.

According to certain embodiments, a wireless device comprising a receiver, a transmitter, processing circuitry and a memory storing instructions executable by the processing circuitry for: receiving at least one reference signal from a transmission point; measuring a propagation-related quantity loss on the basis of the at least one reference signal; and deriving an uplink power setting on the basis of the measured propagation-related quantity. The receiving of the at least one reference signal is performed in accordance with a configuration related to uplink power control.

According to certain embodiments, a method implemented in a transmission point comprises transmitting first control information indicating a configuration related to uplink power control of a wireless device to be served by the transmission point and transmitting at least one reference signal.

According to certain embodiments, a transmission point comprises a receiver, a transmitter, processing circuitry and a memory storing instructions executable by the processing circuitry for transmitting first control information indicating a configuration related to uplink power control of a wireless device to be served by the transmission point and transmitting at least one reference signal.

According to certain embodiments, a computer program comprises computer-readable instructions for causing a programmable processor to perform the method for use in a transmission point.

As one example, in any of the above methods, wireless devices, transmission points, or computer programs, the configuration may indicate which of multiple reference signals to use for the uplink power control. In certain embodiments, the configuration may be configured separately for a specific uplink channel, signal, and/or a group (e.g., a group comprising one or more uplink channels and/or signals). Additional examples embodiments are further discussed in the sections below.

Certain embodiments of the present disclosure provide one or more technical advantages. A technical advantage of certain embodiments includes basing power control on a reference signal (or set of reference signal) selected from a set of options for the reference signal (or a set of reference signals). A technical advantage of certain embodiments includes the ability to base different power control operations on different reference signals (or sets of reference signals). For example, SRS PC may be based on one reference signal (or set of reference signals), whereas PUCCH and PUSCH may be based on another reference signal (or set of reference signals). Embodiments of the present disclosure may include all, some, or none of these advantages. Other advantages may be apparent to those of ordinary skill in the art.

BRIEF DESCRIPTION OF THE DRAWINGS

In FIG. 1, arrows represent signals and boxes represent processing steps applied to the signals.

In FIG. 2, arrows represent signals and boxes represent processing steps applied to the signals.

DETAILED DESCRIPTION

Example embodiments will now be described in more detail with reference to the accompanying drawings for which like numerals represent like and corresponding portions of the various drawings.

Figure 1:
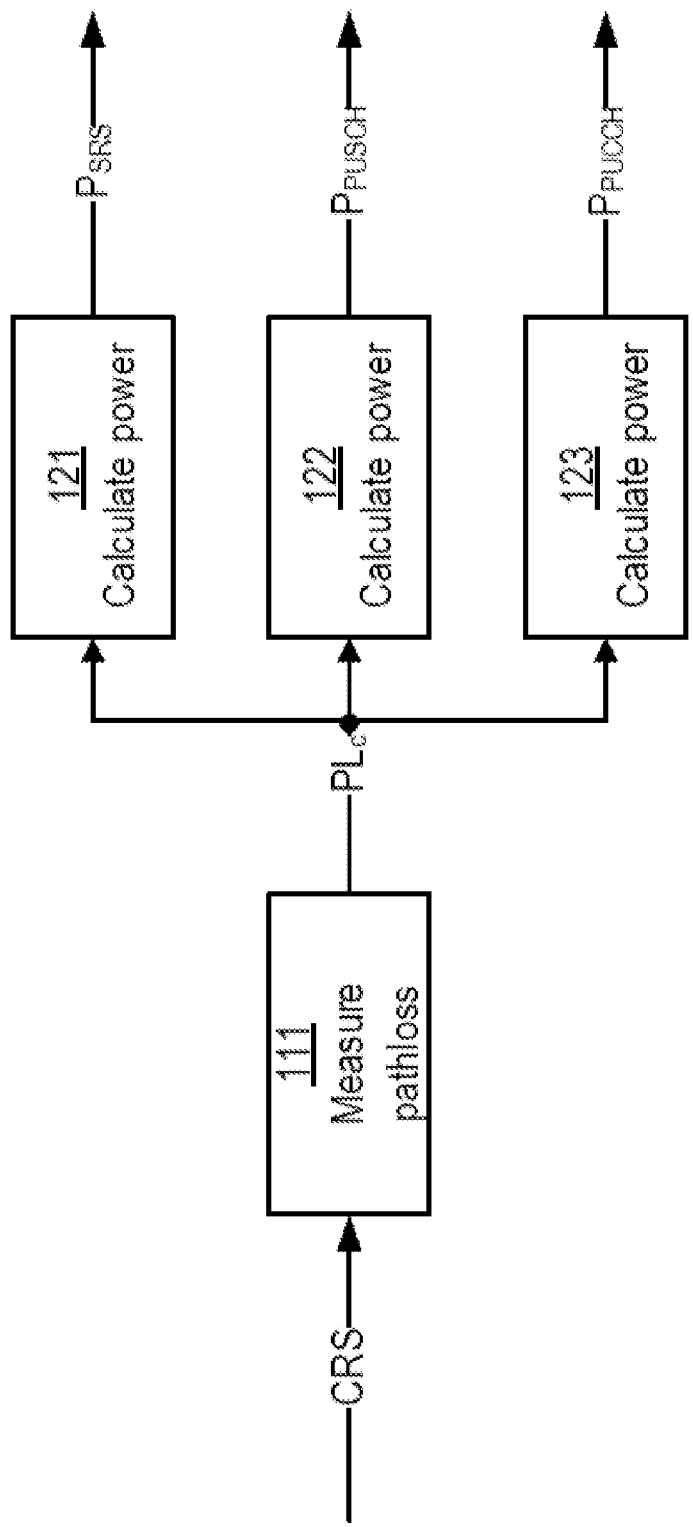
FIG. 1 illustrates an example of a prior art uplink power control arrangement.
Figure 2:
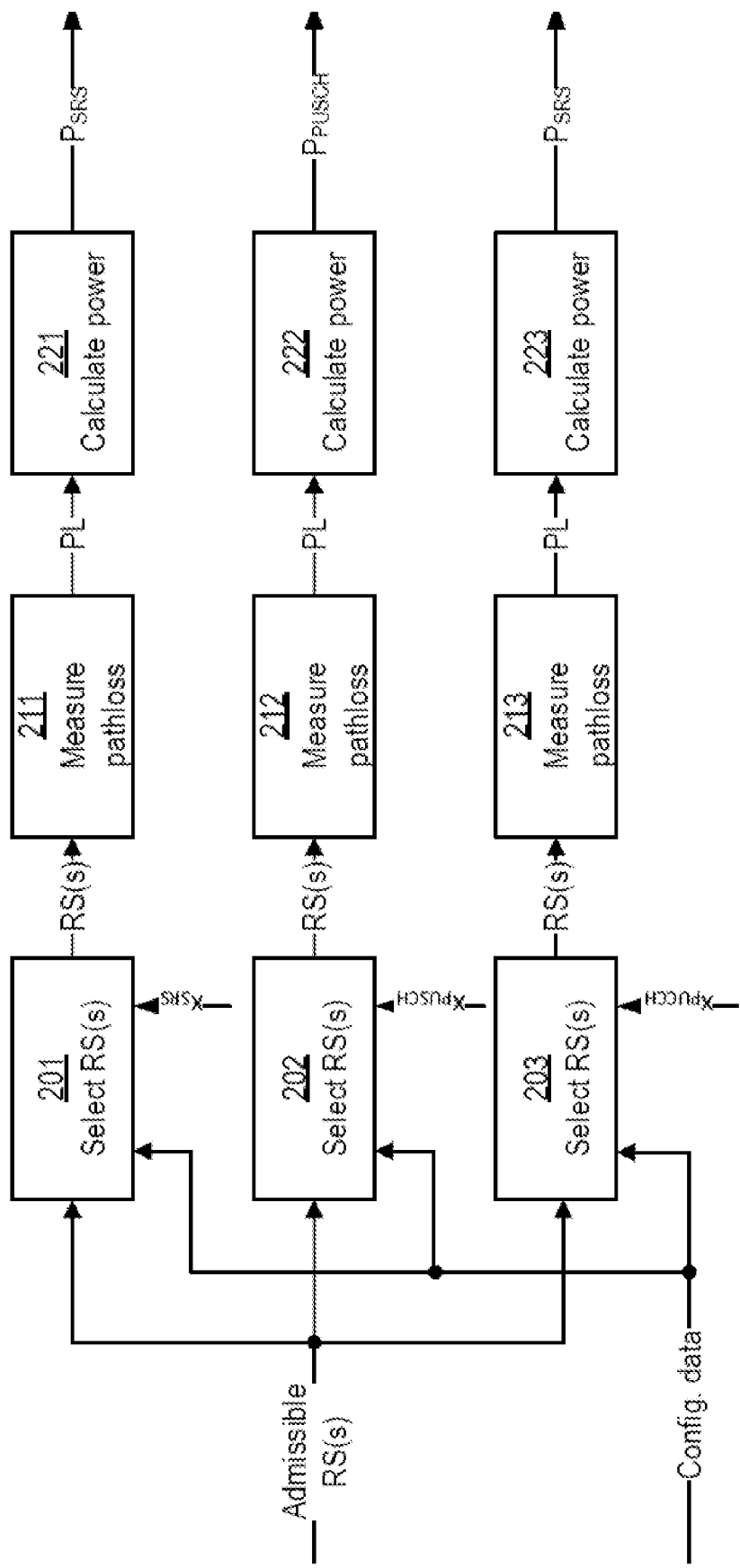
FIG. 2 illustrates an example of signal processing in an uplink power control arrangement, according to certain embodiments of the present disclosure.

FIG. 2 illustrates signal processing in an uplink power control arrangement according to an example embodiment. The signal processing may be performed by a wireless device, such as wireless device 310 discussed with respect to FIG. 3. In FIG. 2, each horizontal line corresponds to a processing chain for providing a power setting for a respective channel or signal. The signal processing setup is illustrated here for channels PUSCH and PUCCH and signal SRS, all of which are transmitted from the wireless device, but can readily be extended to other channels, such as PRACH. It is not essential that the wireless device performs PC in respect of all channels and signals in parallel. It is also not essential that the PC is configurable in a manner specific to each channel or signal, but the configurability may have a granularity of a group of one or more channels and/or signals.

The wireless device is allowed to use any reference signal (RS) in the "subset" discussed above, i.e., currently CSI-RS and any of SSs. The "subset" is represented by the admissible RS(s) in FIG. 2. As illustrated by respective selection stages 201, 202, 203, the wireless device selects one or more of the admissible RSs in a channel- or signal-specific fashion. On this RS(s), the wireless device performs a measurement (or estimation) 211, 212, 213 of a propagation-related quantity PL, such as path loss or reference signal received power (RSRP). The propagation-related quantity PL is then fed to a respective power calculation block 221, 222, 223, which produces the channel- or signal-wise power settings symbolized by the arrows to the right. The wireless device may apply one or more of the power settings. In particular, it may transmit an uplink channel or signal with a power in accordance with a corresponding one of the power settings.

The selection stages 201, 202, 203 may be configured to influence the operation of a receive chain of the wireless devices, e.g., by causing it to receive at frequency and/or time and/or code settings corresponding to the transmission of the selected RSs from the network. The selection stages 201, 202, 203 may be pre-configured (e.g., statically in a network specification, or alternatively semi-statically by higher-layer signaling) in a manner causing it to store configuration data representing a set of configurations, or "options" in the sense discussed below. The wireless device may then receive control information, denoted $x_{SRS}$, $x_{PUSCH}$, $x_{PUCCH}$ for these channels, which indicates one of the pre-configured configurations. While the configuration data may be common for all channels and signals, the control information may be specific to a channel or signal or group thereof. If the selection stages 201, 202, 203 were pre-configured statically, the control information may be contained in semi-static signaling. If the selection stages 201, 202, 203 were pre-configured semi-statically, the control information may be semi-static as well, or my alternatively be contained in dynamic signaling, such as downlink control information (DCI).

The following sections of this disclosure present several example embodiments, which may incorporate the same or similar principles as discussed above.

Embodiments enabling selection of which RS to use at the UE will be discussed initially.

Since multiple reference signals types, including at least SS and CSI-RS, can be used for path loss estimation in UL PC in NR a framework is needed for which reference signal/set of reference signals the UE should use for every point in time (and potentially also per frequency). In one embodiment, the UE can be configured to use the reference signals available for UL PC in different ways. A UE may for instance be configured with one out of a limited set of options in terms on which reference signals to use. In one embodiment this limited set of options is that the UE should base UL PC on:

C1
i. SS, or
ii. One CSI-RS, or
iii. A set of CSI-RSs.

As seen above, the list C1 of options may be pre-defined in a network specification, such as a specification agreed by the 3GPP; alternatively, the list C1 may be semi-statically configured. Hence, the UE is configured with one of the options and then in addition potentially some information about reference signals themselves, for instance which CSI-RS/CSI-RSs for options ii)-iii). Thereby it is made clear what the UE should measure on when estimating path loss for UL PC.

In one embodiment, the CSI-RS in ii) and/or iii) is constrained to be configured as periodic CSI-RS. In another embodiment they may be configured to be periodic and/or aperiodic and/or semi static.

In another embodiment, the list of options is instead:

C2
i. SS, or
ii. One CSI-RS and SS, or
iii. A set of CSI-RSs.

Hence, it is possible that some of the options include multiple types of reference signals. In another embodiment, the list of options is instead:

C3
i. SS, or
ii. A set of CSI-RSs.

In yet another embodiment, the list of options is instead:

C4
i. TRS, or
ii. SS, or iii. One CSI-RS, or
iv. A set of CSI-RSs, where TRS is the tracking reference signal assumed to be part of NR. In one embodiment "a set of CSI-RSs" is connected to a CSI-RS beam sweep and the PC may then be based on a CSI-RS resource indicator (CRI): the PC is hence based on the CSI-RS resource corresponding to the CRI.

Embodiments connecting the PC loops to the RSs will be discussed next.

Reference is made anew to the previous embodiments where the limited set of options was denoted C1. The following use cases for PUCCH and PUSCH for the different options can be identified:

i. SS: A mainstream low-band deployment with a low number of gNB TX/RX antennas. Here path loss estimation from SS may well reflect the true path loss.

ii. One CSI-RS: For cases where the number of gNB TX/RX antennas are higher it may be beneficial to capture the beamforming gain more accurately by utilizing the inherent flexibility in CSI-RS. The flexibility may include selecting a CSI-RS associated with an antenna port that matches current operating conditions. Another use case is when UL transmission is carried out to another TRP than the one transmitting SS; here PC may work poorly in case that it was based on SS.

iii. A set of CSI-RSs: A high hand use case when operating with beam management procedures which may make it beneficial to also use beam specific PC. In case that there are N beam pair links, that the beam management procedures operate on, a set of N CSI-RSs could be configured and connected to different UE RX/TX beams in order to get beam specific PC.

For SRS transmission in use case iii), a few different scenarios are identified. In the first scenario, beam sweeping procedures are performed, which results in a recommended SRI (SRS resource indicator). Here it is necessary that all SRSs are transmitted with the same power, hence the SRS beam sweep PC should be connected to one PC loop, thus not beam specific. It then appears natural to connect this PC loop to either i) or ii) as mentioned above. However, it is in this case not appropriate to connect the SRS PC to iii). Still, for PUSCH and PUCCH it is possible that they would operate with beam management and thereby potentially benefit from using beam specific PC by being configured with iii).

In a second scenario, PUSCH and PUCCH operate with beam management and thereby potentially beam specific PC using iii), whereas SRS transmission is used for performing link adaptation in a reciprocity-based system that utilizes beam management procedures. Here, it would therefore be preferable for the SRS PC to be beam specific and hence connected to the beams in the same manner as PUSCH. Thus, SRS PC should therefore be configured using iii). In another use case SRS is not used by the system and the SRS PC does not need to be configured at all.

In one embodiment, the UE is configured with one of the options i)-iii) for SRS PC, and one of the options i)-iii) for PUCCH PC and one of the options i)-iii) for PUSCH. This illustrates the ability within the present embodiment to configure the UE separately for PUCCH, PUSCH and SRS what option to use for UL PC path loss estimation. In another embodiment, it is possible to configure the UE for which option to use for UL PC path loss estimation separately for SRS, whereas PUCCH and PUSCH share the same option.

In another embodiment, SRS PC is configured to iii) where the size of the set of CSI-RSs has been configured to size M whereas PUCCH is configured to iii) where the size of the set of CSI-RSs has been configured to size N where N≠M. Hence, by enabling configuration separately for PUCCH, PUSCH and SRS it will be possible to configure different sets of CSI-RS.

In another embodiment, PUCCH PC is configured using i) whereas PUSCH PC is configured using iii).

Figure 3:
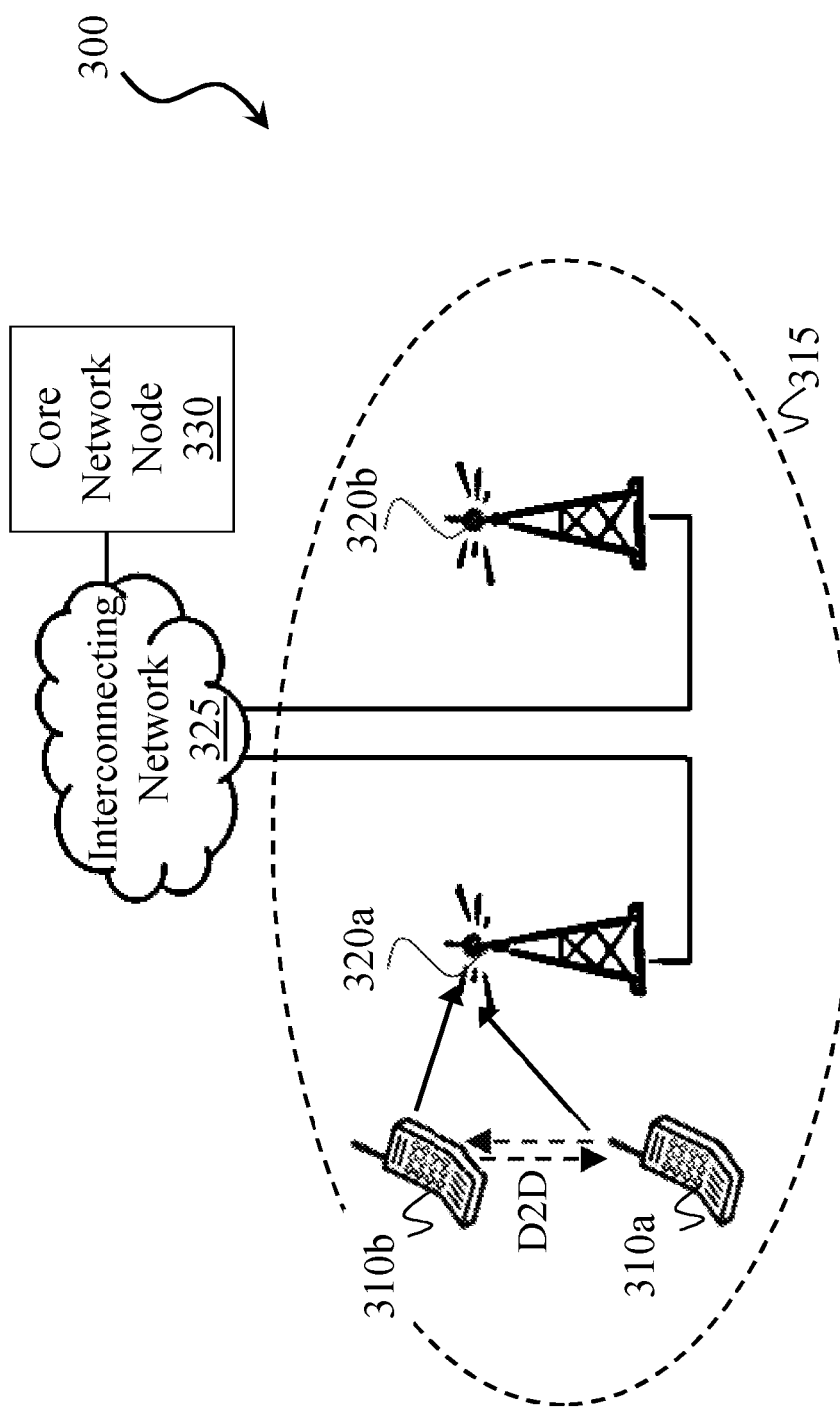
FIG. 3 illustrates an example of a wireless network, in accordance with certain embodiments.

FIG. 3 illustrates an example of a wireless network 300 that may be used for wireless communications. Wireless network 300 includes a plurality of radio nodes. Examples of radio nodes include wireless devices 310a-310b (such as a UE) and transmission points 320a-320b (such as a gNB, eNB, or base station). The transmission points 320 connect to one or more core network nodes 330 via an interconnecting network 325. Wireless devices 310 within coverage area 315 may each be capable of communicating directly with transmission points 320 over a wireless interface. Wireless devices may also be capable of communicating with each other via device-to-device (D2D) communication.

As an example, wireless device 310a may communicate with transmission point 320a over a wireless interface. That is, wireless device 310a may transmit wireless signals and/or receive wireless signals from transmission point 320a. The wireless signals may contain voice traffic, data traffic, control signals, and/or any other suitable information. In some embodiments, an area of wireless signal coverage associated with a transmission point 320 may be referred to as a cell.

In some embodiments wireless device 310 may be interchangeably referred to by the non-limiting term user equipment (UE). Wireless device 310 refers to any type of wireless device communicating with a network node and/or with another wireless device in a cellular or mobile communication system. Examples of wireless devices include target device, device to device (D2D) UE, V2x UE, machine type UE or UE capable of machine to machine (M2M) communication, PDA, PAD, Tablet, mobile terminals, smart phone, laptop embedded equipped (LEE), laptop mounted equipment (LME), USB dongles, etc. Thus, although FIG. 3 illustrates wireless devices 310 as phones, other embodiments may use other types of wireless devices 310. Example embodiments of wireless device 310 are described in more detail below with respect to FIGS. 4-5.

In some embodiments transmission point 320 may be interchangeably referred to by the non-limiting terms radio access node, gNB, eNB, base station, network node, or WAN node. The WAN node can be a UE (e.g. D2D UE) or a network node (e.g., access point, base station, cellular node, etc.). Example embodiments of transmission point 320 are described in more detail below with respect to FIGS. 6-7.

In certain embodiments, transmission points 320 may interface with a radio network controller. The radio network controller may control transmission points 320 and may provide certain radio resource management functions, mobility management functions, and/or other suitable functions. In certain embodiments, the functions of the radio network controller may be included in transmission point 320. The radio network controller may interface with a core network node 330. In certain embodiments, the radio network controller may interface with the core network node 330 via an interconnecting network 325.

The interconnecting, network 325 may refer to any interconnecting system capable of transmitting audio, video, signals, data, messages, or any combination of the preceding. The interconnecting network 325 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 330 may manage the establishment of communication sessions and various other functionalities for wireless devices 310. Wireless devices 310 may exchange certain signals with the core network node using the non-access stratum layer. In non-access stratum signaling, signals between wireless devices 310 and the core network node 330 may be transparently passed through the radio access network. In certain embodiments, transmission points 320 may interface with one or more network nodes over an internode interface. For example, transmission points 320a and 320b may interface over an internode interface.

Although FIG. 3 illustrates a particular arrangement of network 300, the present disclosure contemplates that the various embodiments described herein may be applied to a variety of networks having any suitable configuration. For example, network 300 may include any suitable number of wireless devices 310 and transmission points 320, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While some embodiments are described for a particular RAT for the purposes of example and explanation, other embodiments are applicable to any suitable RAT, which may include LTE, LTE FDD/TDD, NR, WCDMA/HSPA, GSM/GERAN, Wi Fi, WLAN, CDMA2000, etc.

Figure 4:
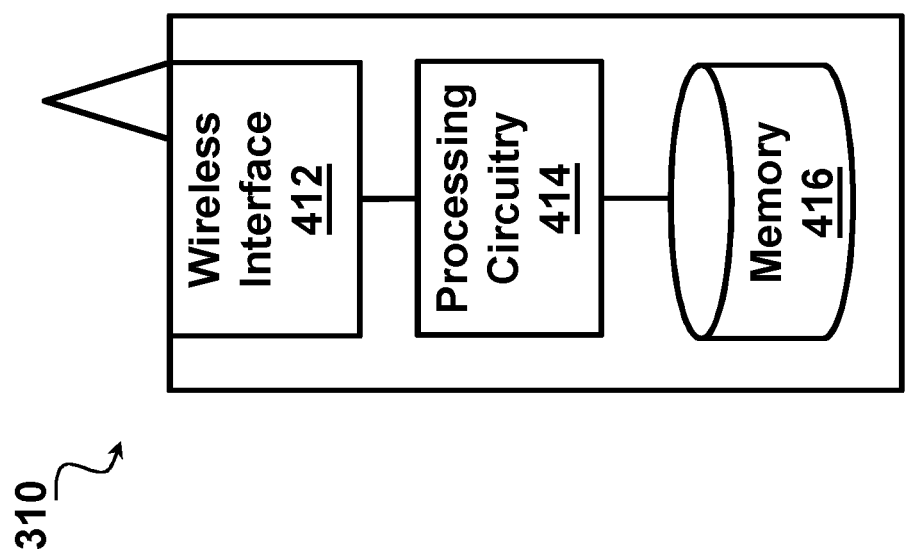
FIG. 4 illustrates an example of a wireless device, in accordance with certain embodiments.

FIG. 4 is a block diagram of an exemplary wireless device 310, in accordance with certain embodiments. Wireless device 310 includes one or more each of a wireless interface 412, processing circuitry 414 (e.g., comprising one or more processors), and memory 416. In some embodiments, wireless interface 412 includes a transmitter that facilitates transmitting wireless signals to and a receiver that facilitates receiving wireless signals from network node/WAN node/transmission point 320 (e.g., via an antenna), processing circuitry 414 executes instructions to provide some or all of the functionality described herein as being provided by a wireless device (or UE), and memory 416 stores the instructions executed by processing circuitry 414.

Processing circuitry 414 may include any suitable combination of hardware and software implemented in one or more modules to execute instructions and manipulate data to perform some or all of the described functions of wireless device 310, such receiving at least one reference signal in accordance with a configuration related to uplink power control, measuring a propagation-related quantity (such as a loss) on the basis of the at least one reference signal, and deriving an uplink power setting based on the measured propagation-related quantity. In certain embodiments, processing circuitry 414 may include some or all of the components discussed with reference to FIG. 2 and/or FIG. 5 herein. In certain embodiments, processing circuitry may perform the methods of one or more of FIG. 8. 10, or 11 and/or further example embodiments 1-29 discussed below. In some embodiments, processing circuitry 414 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 416 is generally operable to store instructions, such as a computer program, software, an application including one or more of logic, rules, algorithms, code, tables, etc. and/or other instructions capable of being executed by a processor. Examples of memory 416 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 414 of wireless device 310.

Other embodiments of wireless device 310 may include additional components beyond those shown in FIG. 4 that may be responsible for providing certain aspects of the wireless device's functionality, including any of the functionality described herein and/or any additional functionality (including any functionality necessary to support the solution described herein). As just one example, wireless device 310 may include input devices and circuits, output devices, and one or more synchronization units or circuits, which may be part of the processing circuitry. Input devices include mechanisms for entry of data into wireless device 310. For example, input devices may include input mechanisms, such as a microphone, input elements, a display, etc. Output devices may include mechanisms for outputting data in audio, video and/or hard copy format. For example, output devices may include a speaker, a display, etc.

Figure 5:
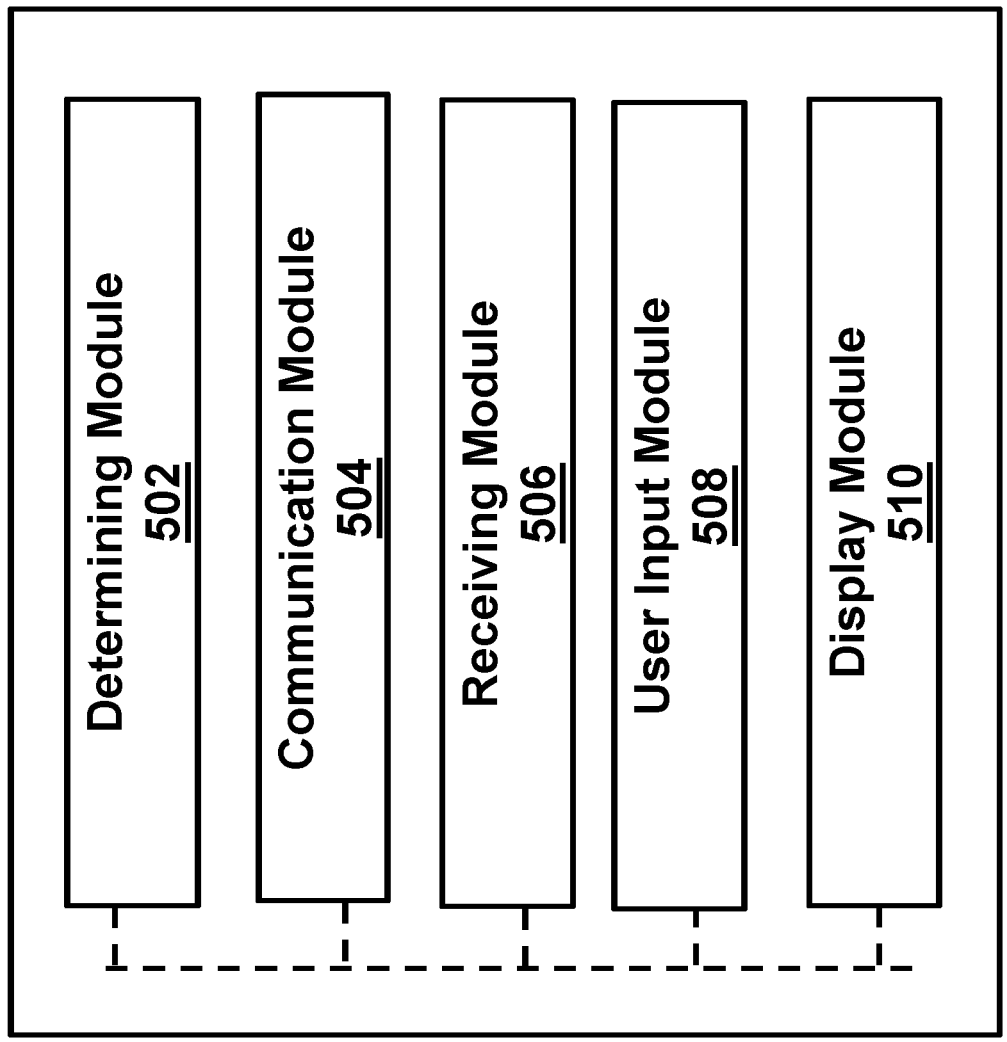
FIG. 5 illustrates an example of components of a wireless device, such as the wireless device of FIG. 4, in accordance with certain embodiments.

FIG. 5 illustrates examples of modules that can be included in wireless device 310. In certain embodiments, wireless device 310 may include any one or more of determining module(s) 502, communication module(s) 504, receiving module(s) 506, user input module(s) 508, display module(s) 510, and/or other suitable modules. The functionality of the modules may be integrated in a single component or separated among several components in any suitable manner. In certain embodiments, one or more of the modules may be implemented using processing circuitry 414 described with respect to FIG. 4.

The determining module 502 may perform the processing functions of wireless device 310 (including any of the wireless device functionality to support the embodiments described herein, such as the functionality described with respect to one or more of FIG. 2, 8, 10, or 11 and/or further example embodiments 1-29). As one example, the determining module 502 may determine a configuration related to uplink power control with which to receive at least one reference signal, measure a propagation-related quantity (such as a loss) on the basis of receiving the at least one reference signal, and derive an uplink power setting based on the measured propagation-related quantity.

The determining module 502 may include or be included in processing circuitry 414 described above in relation to FIG. 4. The determining module 502 may include analog and/or digital circuitry configured to perform any of the functions of the determining module 502 and/or processing circuitry described above. The functions of the determining module 502 described above may, in certain embodiments, be performed in one or more distinct modules.

The communication module 504 may perform the transmission functions of wireless device 310. For example, in certain embodiments the communication module 504 may communicate uplink signals according to the power setting derived by the determining module 502. The communication module 504 may include a transmitter and/or a wireless interface, such as wireless interface 412 described above in relation to FIG. 4. The communication module 504 may include circuitry configured to wirelessly transmit messages and/or signals. In particular embodiments, the communication module 504 may receive messages and/or signals for transmission from the determining module 502. In certain embodiments, the functions of the communication module 504 described above may be performed in one or more distinct modules.

The receiving module 506 may perform the receiving functions of wireless device 310. For example, the receiving module 506 may receive information from a network node (e.g., transmission point 320). The information could include at least one reference signal received according to a configuration related to uplink power. Additionally, in certain embodiments, the configuration related to uplink power may be received from the network node (e.g., FIG. 9). The receiving module 506 may include a receiver and/or a wireless interface, such as wireless interface 412 described above in relation to FIG. 4. The receiving module 506 may include circuitry configured to wirelessly receive messages and/or signals. In certain embodiments, the receiving module 506 may include circuitry configured to receive information from memory 416 of wireless device 310. In particular embodiments, the receiving module 506 may communicate received messages and/or signals to the determining module 502. The functions of the receiving module 506 described above may, in certain embodiments, be performed in one or more distinct modules.

In certain embodiments, wireless device 310 may optionally include a user input module 508 that may receive user input intended for wireless device 310. For example, the user input module 508 may receive key presses, button presses, touches, swipes, audio signals, video signals, and/or any other appropriate signals. The user input module 508 may include one or more keys, buttons, levers, switches, touchscreens, microphones, and/or cameras. The user input module 508 may communicate received signals to the determining module 502. The functions of the user input module 508 described above may, in certain embodiments, be performed in one or more distinct modules.

In certain embodiments, wireless device 310 may optionally include a display module 510, which may present signals on a display of wireless device 310. The display module 510 may include the display and/or any appropriate circuitry and hardware configured to present signals on the display. The display module may receive signals to present on the display from the determining module 502. The functions of the display module 502 described above may, in certain embodiments, be performed in one or more distinct modules.

Each module depicted in FIG. 5 may include any suitable configuration of hardware and/or software. Wireless device 310 may include additional modules beyond those shown in FIG. 5 that may be responsible for providing any suitable functionality, including any of the functionality described above and/or any additional functionality (including any functionality necessary to support the various solutions described herein).

In certain embodiments, some or all of the modules shown in FIG. 5 can be combined with one or more modules shown in FIG. 4. As an example, certain embodiments may combine at least some of the functionality of the processing circuitry (FIG. 4) with the determining module (FIG. 5). As another example, certain embodiments may combine at least some of the functionality of the wireless interface (FIG. 4) with the communication and/or receiving modules (FIG. 5).

Figure 6:
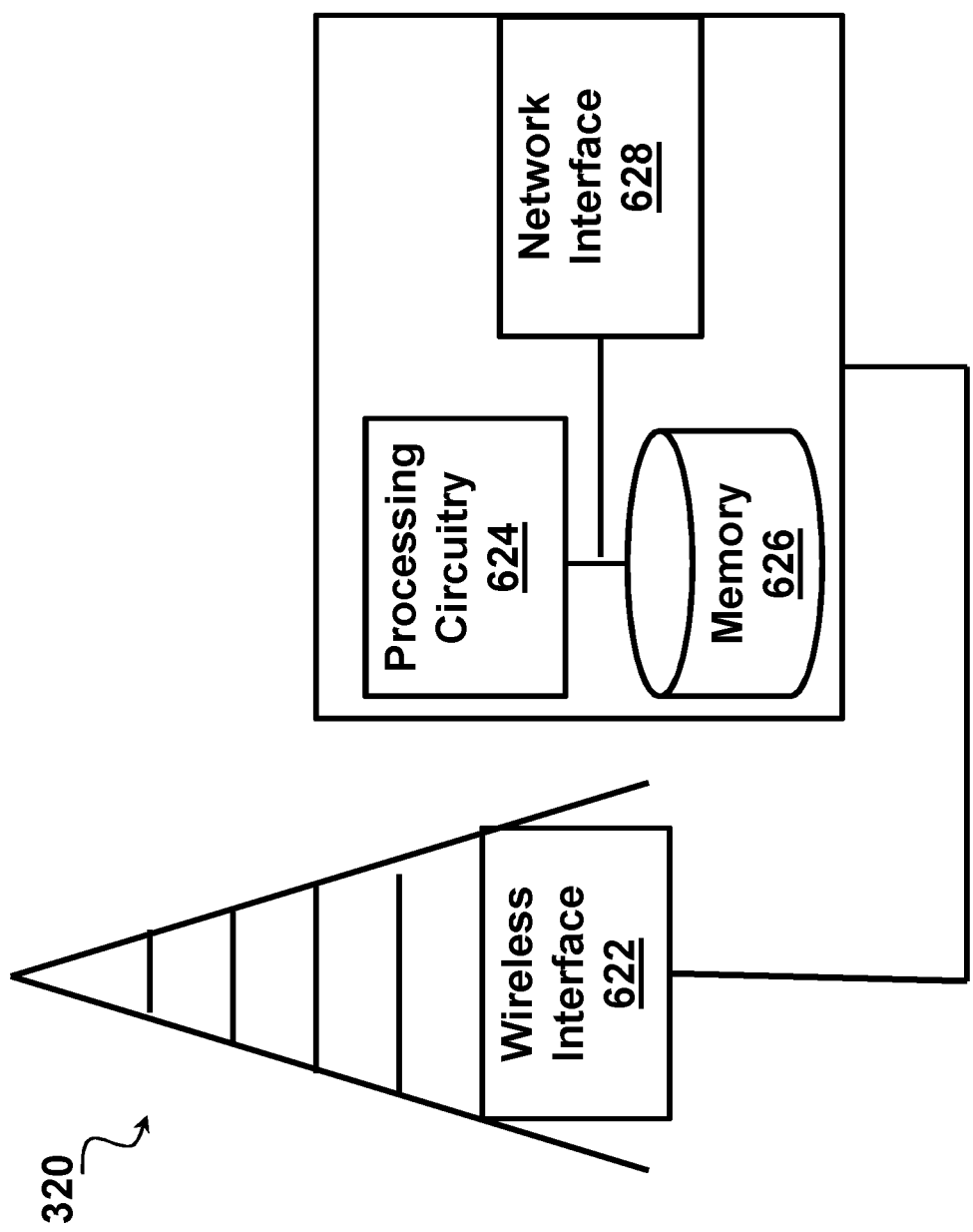
FIG. 6 illustrates an example of a transmission point, in accordance with certain embodiments.

FIG. 6 is a block diagram of an exemplary network node, such as transmission point 320, in accordance with certain embodiments. Transmission point 320 may include one or more of wireless interface(s) 622, processing circuitry 624 (e.g., comprising one or more processors), memory (or memories) 626, and/or network interface(s) 628. In some embodiments, wireless interface 622 comprises a transmitter that facilitates transmitting wireless signals to and a receiver that facilitates receiving wireless signals from wireless device 310 (e.g., via an antenna), processing circuitry 624 executes instructions to provide some or all of the functionality described herein as being provided by a transmission point 320, memory 626 stores the instructions executed by processing circuitry 624, and network interface 628 communicates signals to backend network components, such as a gateway, switch, router, Internet, Public Switched Telephone Network (PSTN), core network nodes or radio network controllers, etc.

Processing circuitry 624 may include any suitable combination of hardware and software implemented in one or more modules to execute instructions and manipulate data to perform some or all of the described functions of transmission point 320, such as the functions of transmitting a configuration related to uplink power control of a wireless device to be served by the transmission point and transmitting one or more reference signals. Examples of functionality performed by a transmission point's processing circuitry 624 are described below with respect to FIGS. 9 and 12 and further example embodiments 30-47. Examples of a configuration related to uplink power control of a wireless device that may be transmitted by the transmission point 320 are also discussed with respect to FIG. 2. In some embodiments, processing circuitry 624 may include, for example, one or more computers, one or more central processing units (CPUs), one or more microprocessors, one or more applications, and/or other logic. In certain embodiments, processing circuitry 624 may comprise one or more of the modules discussed with respect to FIG. 7.

Memory 626 is generally operable to store instructions, such as a computer program, software, an application including one or more of logic, rules, algorithms, code, tables, etc. and/or other instructions capable of being executed by a processor. Examples of memory 626 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 628 is communicatively coupled to processing circuitry 624, and network interface 628 may refer to any suitable device operable to receive input for transmission point 320, send output from transmission point 320, perform suitable processing of the input or output or both, communicate to other devices, or any combination of the preceding. Network interface 628 may include appropriate hardware (e.g., port, modem, network interface card, etc.) and software, including protocol conversion and data processing capabilities, to communicate through a network.

Other embodiments of transmission point 320 may include additional components beyond those shown in FIG. 6 that may be responsible for providing certain aspects of the transmission point 320's functionality, including any of the functionality described herein and/or any additional functionality (including any functionality necessary to support the solutions described herein). Core network node 330 may have comprise similar components as those shown in FIG. 6, however, a wireless interface (e.g., wireless interface 622) is optional for the core network node 330. The various different types of network nodes may include components having the same physical hardware but configured (e.g., via programming) to support different radio access technologies, or may represent partly or entirely different physical components.

Figure 7:
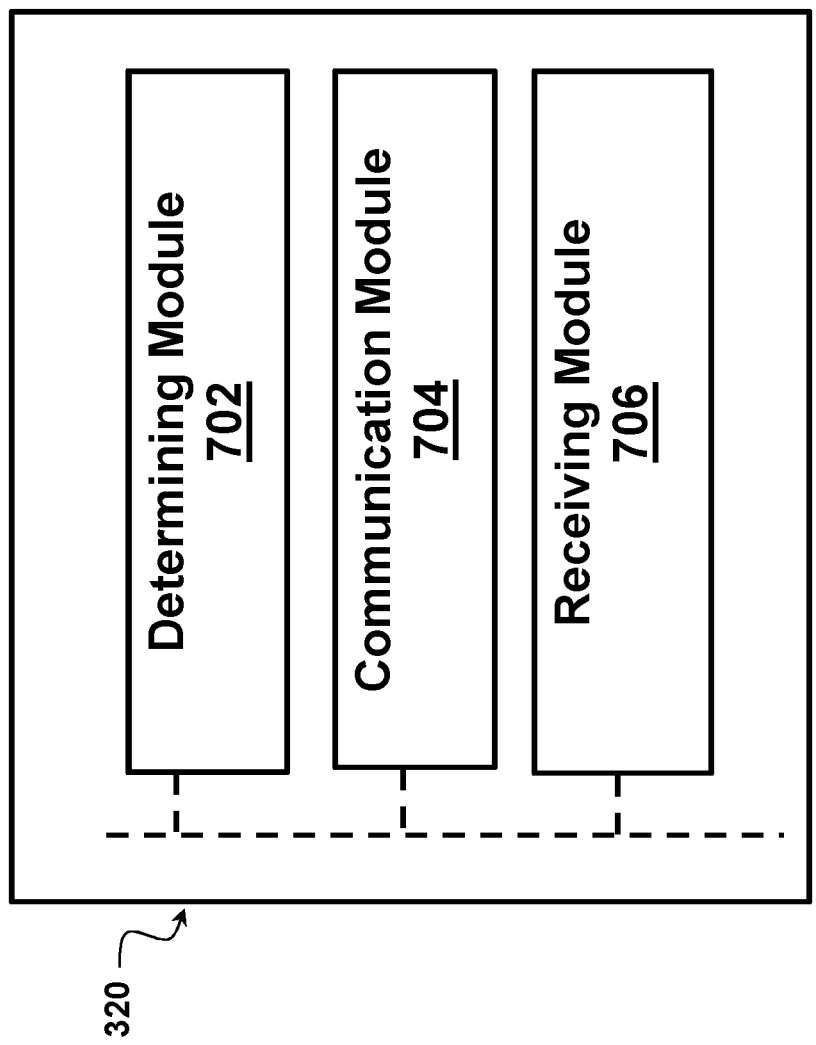
FIG. 7 illustrates an example of components of a transmission point, such as the transmission point of FIG. 6, in accordance with certain embodiments

FIG. 7 illustrates examples of modules that can be included in transmission point 320. In certain embodiments, transmission point 320 may include any one or more of determining module(s) 702, communication module(s) 704, receiving module(s) 706, and/or other suitable modules. The functionality of the modules may be integrated in a single component or separated among several components in any suitable manner. In certain embodiments, one or more of the modules may be implemented using processing circuitry 624 described with respect to FIG. 6.

Figure 9:
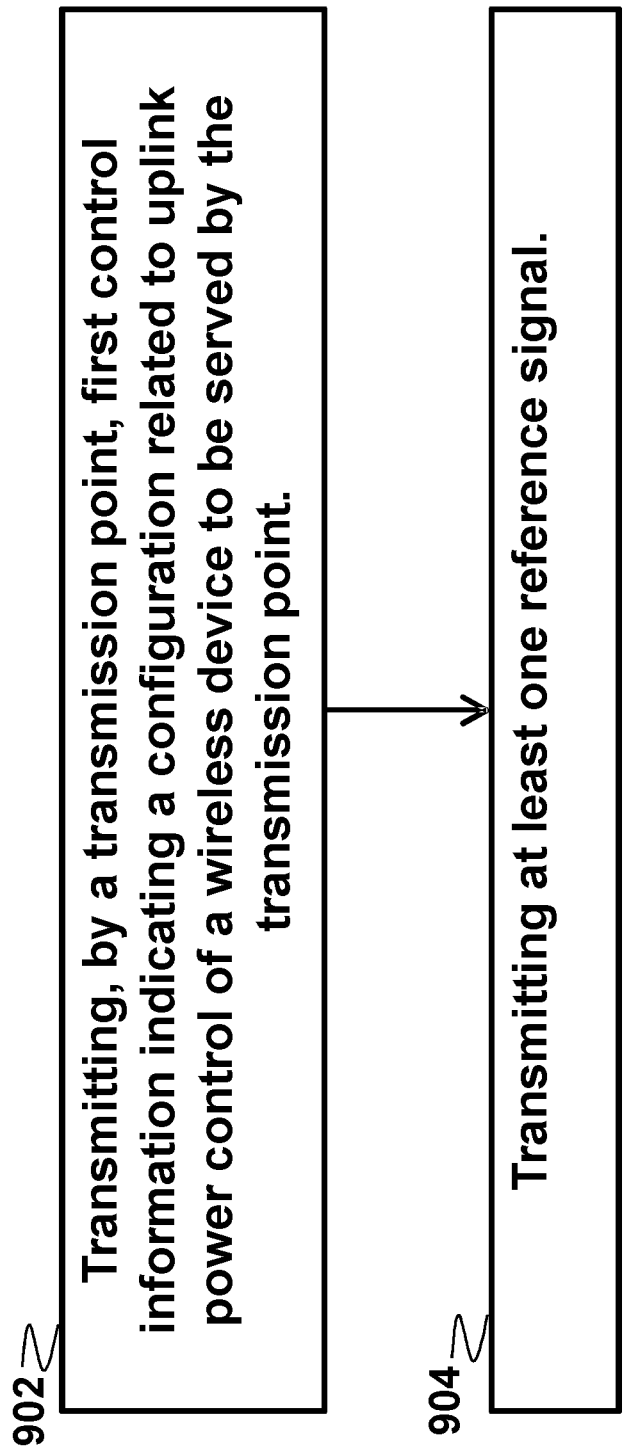
FIG. 9 illustrates an example of a method that may be performed by a transmission point, in accordance with certain embodiments.
Figure 12:
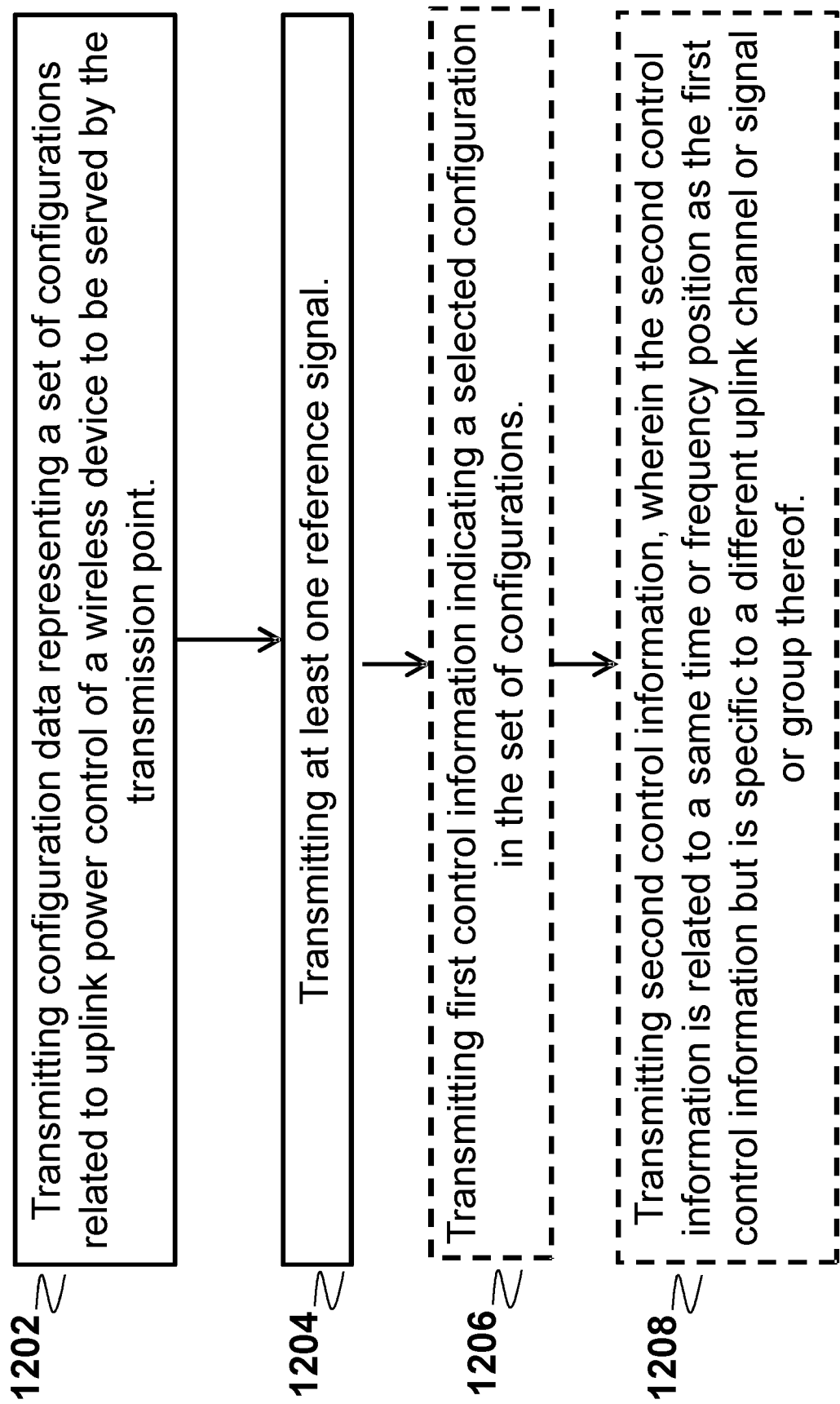
FIG. 12 illustrates an example of a method that may be performed by a transmission point, in accordance with certain embodiments.

The determining module 702 may perform the processing functions of transmission point 320 (including any of the transmission point functionality to support the embodiments described herein, such as the functionality described with respect to one or more of FIG. 9 or 12 and/or further example embodiments 30-47). As one example, the determining module 702 may determine a configuration related to uplink power control of a wireless device to be served by the transmission point. Certain embodiments of the configuration are discussed herein, for example, with respect to FIG. 2.

The determining module 702 may include analog and/or digital circuitry configured to perform any of the functions of the determining module 702 and/or processing circuitry 624 described above. The functions of the determining module 702 described above may, in certain embodiments, be performed in one or more distinct modules.

The communication module 704 may perform the transmission functions of transmission point 320. As one example, the communication module 704 may transmit to wireless device 310 a configuration related to uplink power control of a wireless device to be served by the transmission point. As another example, the communication module 704 may transmit one or more reference signals. The communication module 704 may include a transmitter and/or a wireless interface, such as wireless interface 622 described above in relation to FIG. 6. As another example, the communication module 704 may send information to other transmission points 320. The communication module 704 may include a network interface, such as interface 628 described above in relation to FIG. 6. The communication module 704 may include circuitry configured to transmit wireless and/or wired messages and/or signals. In particular embodiments, the communication module 704 may receive messages and/or signals for transmission from the determining module. In certain embodiments, the functions of the communication module 704 described above may be performed in one or more distinct modules.

The receiving module 706 may perform the receiving functions of transmission point 320. For example, the messages from wireless device 310. The receiving module 706 may include a receiver and/or a wireless interface, such as wireless interface 622 described above in relation to FIG. 6. As another example, the receiving module 706 may receive information from other transmission points 320. The receiving module 706 may include a network interface, such as interface 628 described in relation to FIG. 6. The receiving module 706 may include circuitry configured to receive wireless and/or wired messages and/or signals. In certain embodiments, the receiving module 706 may include circuitry configured to receive information from memory 624 of transmission point 320. In particular embodiments, the receiving module 706 may communicate received messages and/or signals to the determining module. The functions of the receiving module 706 described above may, in certain embodiments, be performed in one or more distinct modules.

In certain embodiments, some or all of the modules shown in FIG. 7 can be combined with one or more modules shown in FIG. 6. As an example, certain embodiments may combine at least some of the functionality of the processing circuitry (FIG. 6) with the determining module (FIG. 7).

Figure 8:
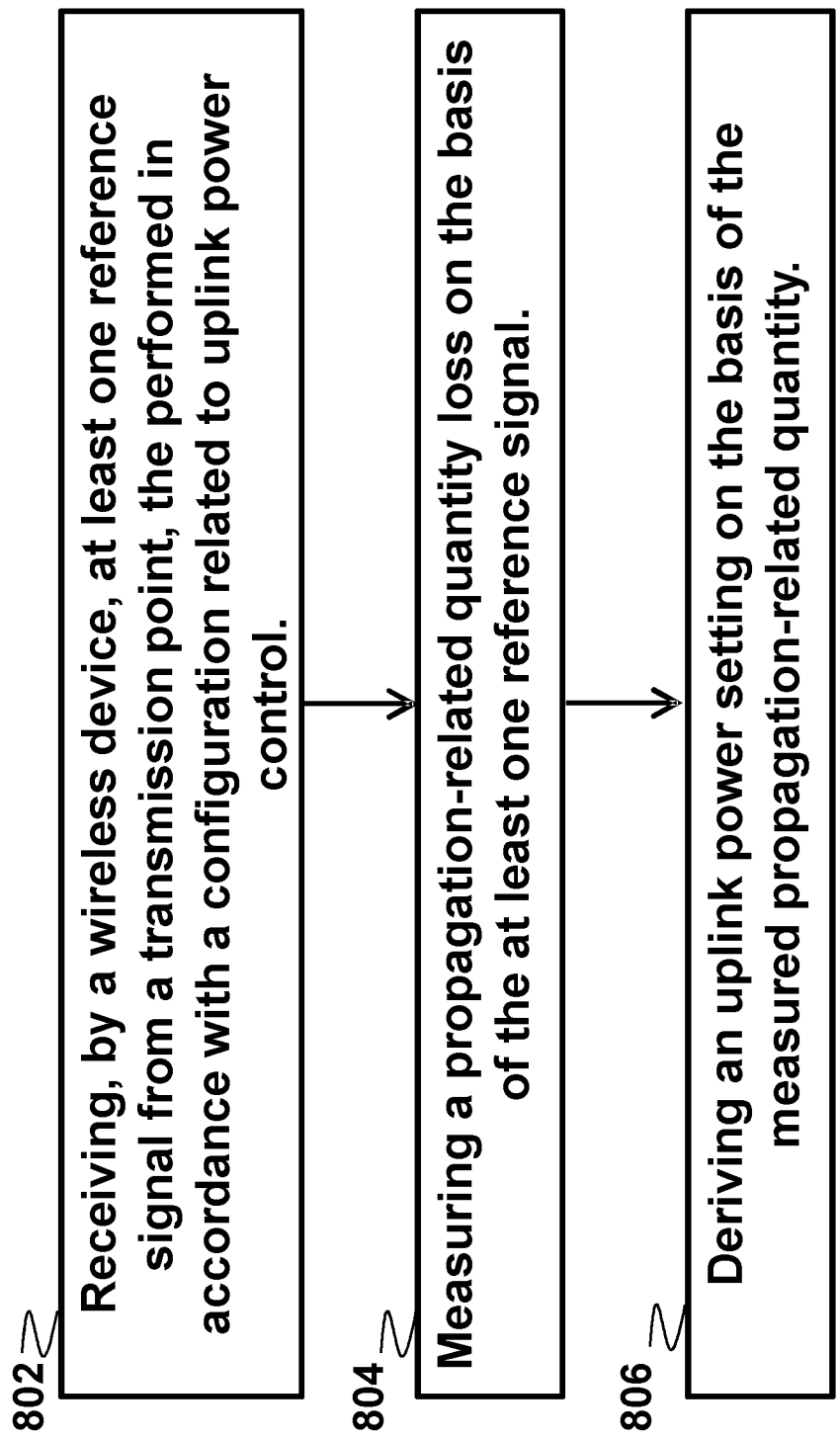
FIG. 8 illustrates an example of a method that may be performed by a wireless device, in accordance with certain embodiments.

FIG. 8 illustrates an example of a method for use in a wireless device 310, in accordance with certain embodiments. At step 802, the method receives at least one reference signal from a transmission point 320. The receiving is performed in accordance with a configuration related to uplink power control. In certain embodiments, the configuration may indicate which of multiple reference signals to use for the uplink power control. In certain embodiments, the configuration may be configured separately for a specific uplink channel, signal, and/or a group (e.g., a group comprising one or more uplink channels and/or signals). Additional examples of configurations are discussed, e.g., with respect to FIG. 2 and further example embodiments 1-29. At step 804, the method measures a propagation-related quantity loss on the basis of the at least one reference signal. At step 806, the method derives an uplink power setting on the basis of the measured propagation-related quantity. The method may further comprise sending uplink signals according to the derived uplink power setting. In certain embodiments, different uplink power settings may be derived for different uplink channels, signals, and/or groups thereof.

FIG. 9 illustrates an example of a method for use in a transmission point 320, in accordance with certain embodiments. At step 902, the method transmits first control information indicating a configuration related to uplink power control of a wireless device to be served by the transmission point. In certain embodiments, the configuration may indicate which of multiple reference signals to use for the uplink power control. In certain embodiments, the configuration may be configured separately for a specific uplink channel, signal, and/or a group (e.g., a group comprising one or more uplink channels and/or signals). At step 904, the method transmits at least one reference signal.

In an example embodiment, to enable a way for the UE to efficiently estimate the path loss, it is proposed to configure the UE with one of a limited set of options in terms of which reference signal/set of reference signals to use for UL PC, and to apply this configuration separately for SRS, PUCCH and PUSCH, and possibly PRACH. This example embodiment may make it possible to base for instance SRS PC on one reference signal/set of reference signals whereas PUCCH and PUSCH is based on another reference signal/set of reference signals. This may be beneficial in some use cases.

Figure 10:
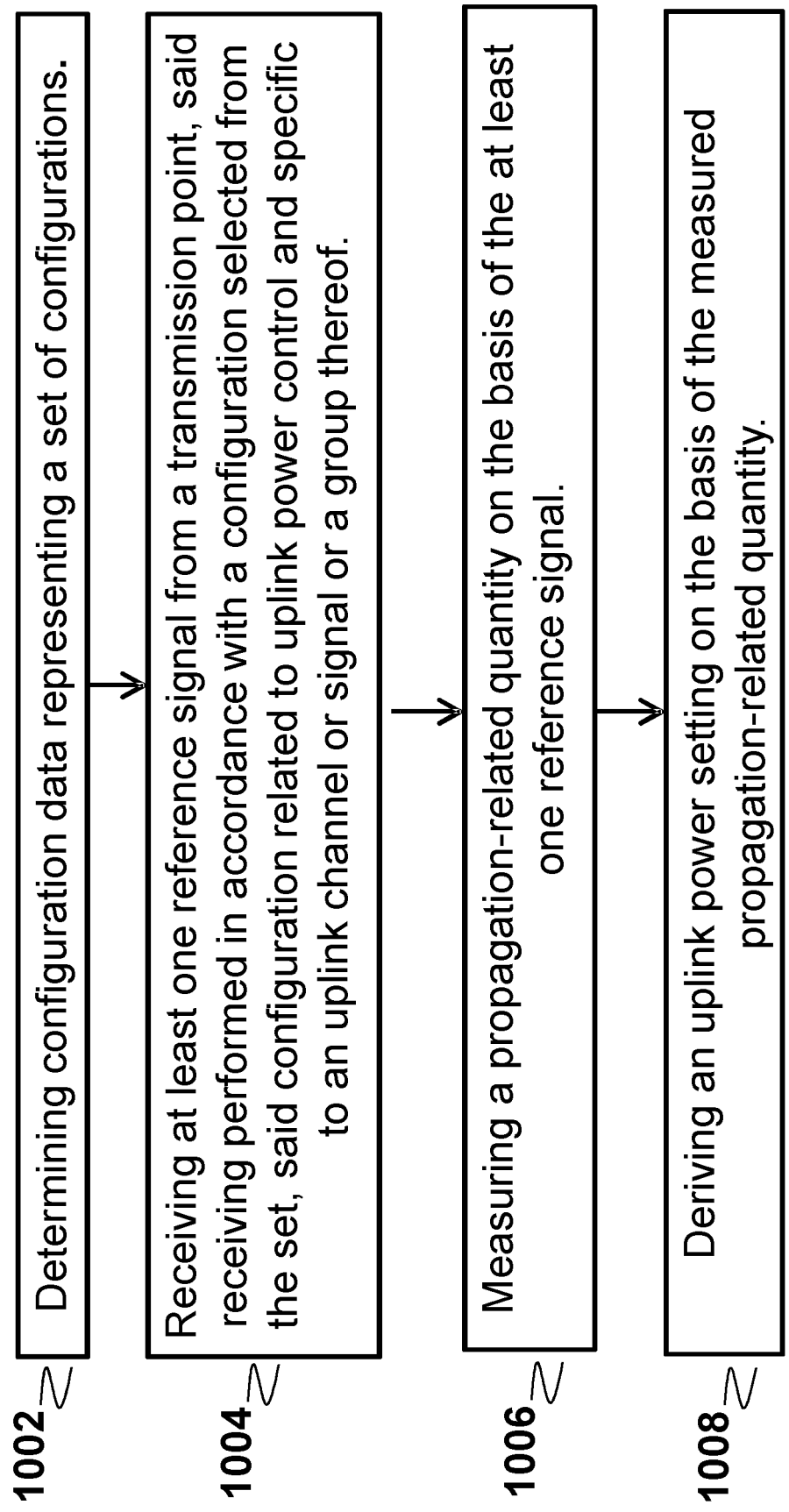
FIGS. 10 and 11 illustrate an example of a method that may be performed by a wireless device, in accordance with certain embodiments.

FIG. 10 illustrates an example of a method implemented in a wireless device, such as wireless device 310 discussed above. The method illustrated in FIG. 10 begins at step 1002 with determining configuration data representing a set of configurations. For example, the configuration data can be determined by receiving the configuration data from a network node, such as transmission point 320 discussed above. In certain embodiments, the configuration data is received in semi-static signaling. In certain embodiments, the set of configurations is specific to an uplink channel or signal or group thereof. Examples of a channel or signal or group thereof can include one or more of PUSCH, PUCCH, and/or SRS. In certain embodiments, the configuration data indicates a size of a set of reference signals in each configuration.

The method proceeds to step 1004 with receiving at least one reference signal from a transmission point, such as transmission point 320 discussed above. The receiving of the at least one reference signal is performed in accordance with a configuration selected from the set of configurations determined in step 1002. The selected configuration relates to uplink power control and is specific to an uplink channel or signal or a group thereof. In certain embodiments, the selection of the configuration is made based on receiving control information, as further discussed below with respect to FIG. 11. In certain embodiments, the configuration is independently selectable from the set for each time segment or each frequency segment or each time-frequency tile.

At step 1006, the method proceeds with measuring a propagation-related quantity on the basis of the at least one reference signal. Examples of a propagation-related quantity include path loss relative to the transmission point and/or a path loss-related quantity. At step 1008, the method comprises deriving an uplink power setting on the basis of the measured propagation-related quantity. The wireless device can then send uplink signals in accordance with the uplink power setting derived in step 1008.

Figure 11:
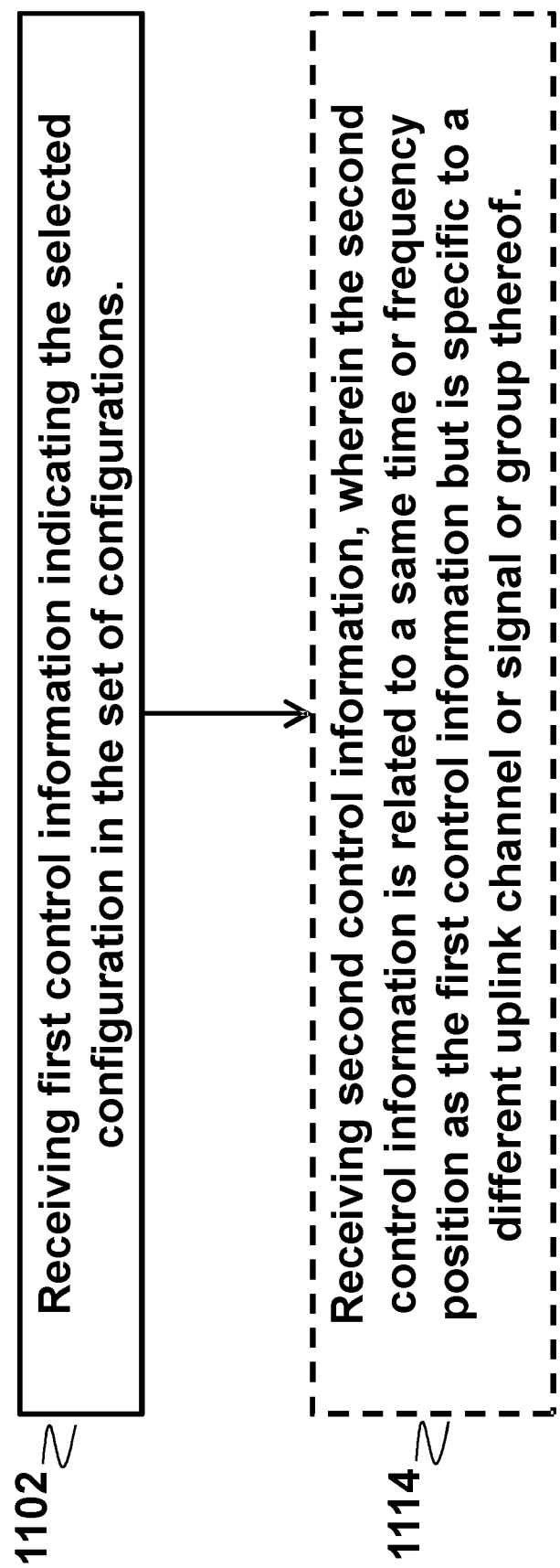

FIG. 11 illustrates an example of a method implemented in a wireless device, such as wireless device 310 discussed above. At step 1102, the method comprises receiving first control information. For example, the first control information can be received from a network node, such as transmission point 320 discussed above. The first control information can be received in dynamic signaling, such as in DCI, or semi-static signaling, such as higher layer signaling. The first control information indicates a selected configuration in a set of configurations. In certain embodiments, the first control information is specific for an uplink channel or signal or group thereof.

In certain embodiments, the method further comprises receiving second control information, as shown in step 1104 of FIG. 11. The second control information is specific to an uplink channel or signal or group thereof that is different than the uplink channel or signal or group thereof to which the first control information pertains. The second control information is related to a same time or frequency position as the first control information in the sense that time or frequency position is the same at the level of granularity at which the first control information and second control information are conveyed. In particular, if the control information applies to one cell at a time, then two frequencies or frequency intervals may be understood as a "same frequency position" if they are contained in the frequency interval of the same cell. Similarly, if the control information applies to one or more slots, then two points in time or time intervals may be a "same time position" if they are contained in the same slot or finite set of consecutive slots.

With reference to FIG. 10, the first control information indicates which of the set of configurations determined in step 1002 to select for receiving at least one reference signal in step 1004 in order to measure a propagation-related quantity (step 1006) and derive an uplink power setting (1008) for an uplink channel or signal or group thereof. The second control information indicates which of the set of configurations determined in step 1002 to select for receiving at least one reference signal in step 1004 in order to measure a propagation-related quantity (step 1006) and derive an uplink power setting (1008) for a different uplink channel or signal or group thereof.

Additional examples of configurations that may be used in the methods of FIGS. 10 and/or 11 are discussed, e.g., with respect to FIG. 2 above and further example embodiments 1-29 below.

FIG. 12 illustrates an example of a method implemented in a transmission point, such as transmission point 320 discussed above. At step 1202, the method comprises transmitting configuration data. As an example, the configuration data can be transmitted in semi-static signaling. The configuration data represents a set of configurations related to uplink power control of a wireless device (e.g., wireless device 310) to be served by the transmission point. In certain embodiments, the set of configurations is specific to an uplink channel or signal or group thereof. Examples of an uplink channel or signal or group thereof include a PUSCH, PUCCH, and/or SRS. In certain embodiments, the configuration data indicates a size of a set of reference signals in each configuration.

At step 1204, the method comprises transmitting at least one reference signal. As discussed above with respect to FIG. 10, the wireless device receives the reference in accordance with a selected configuration in the set of configurations in order to derive an uplink power setting. In certain embodiments, the transmission point can indicate the selected configuration to the wireless device. For example, FIG. 12 illustrates an embodiment in which the method may further comprise transmitting first control information in step 1206. For example, the first control information can be transmitted in dynamic signaling, such as in DCI, or semi-static signaling, such as higher layer signaling. The first control information indicates a selected configuration in the set of configurations. In certain embodiments, the first control information is specific for an uplink channel or signal or group thereof. In certain embodiments, the configuration is independently selectable from the set for each time segment or each frequency segment or each time-frequency tile.

In certain embodiments, the method further comprises transmitting second control information in step 1208. The second control information indicates a selected configuration. As discussed above, the selected configuration indicated by the first control information of step 1206 is specific to an uplink channel or signal or group thereof. In step 1208, the selected configuration indicated by the second control information is specific to a different uplink channel or signal or group thereof. The second control information is related to a same time or frequency position as the first control information in the sense that time or frequency position is the same at the level of granularity at which the first control information and second control information are conveyed. In particular, if the control information applies to one cell at a time, then two frequencies or frequency intervals may be understood as a "same frequency position" if they are contained in the frequency interval of the same cell. Similarly, if the control information applies to one or more slots, then two points in time or time intervals may be a "same time position" if they are contained in the same slot or finite set of consecutive slots.

Additional examples of configurations that may be used in the method of FIG. 12 are discussed, e.g., with respect to FIG. 2 above and further example embodiments 30-47 below.

A concise description of advantageous example embodiments follows.

1. A method implemented in a wireless device, comprising:

receiving at least one reference signal from a transmission point;

measuring a propagation-related quantity loss on the basis of the at least one reference signal; and deriving an uplink power setting on the basis of the measured propagation-related quantity, wherein said receiving of at least one reference signal is performed in accordance with a configuration related to uplink power control.

2. The method of embodiment 1, wherein the uplink power setting is specific to an uplink channel or signal or a group of thereof.

3. The method of embodiment 2, wherein the channel or signal or group thereof is one or more of: PUSCH, PUCCH, PRACH, SRS.

4. The method of any of the preceding embodiments, wherein the configuration is specific to an uplink channel or signal or a group thereof.

5. The method of embodiment 4, wherein the channel or signal or group thereof is one or more of: PUSCH, PUCCH, PRACH, SRS.

6. The method of embodiment 5, wherein the configuration for SRS is different from the configuration for PUSCH.

7. The method of any of the preceding embodiments, wherein the uplink power setting is derived in accordance with a predefined rule specific to an uplink channel or signal or group thereof.

8. The method of any of the preceding embodiments, further comprising determining configuration data representing a set of configurations, wherein the configuration is selected from the set.

9. The method of embodiment 8, wherein the set of configurations includes at least one configuration suitable for non-beam-specific uplink power control and at least one configuration suitable for beam-specific uplink power control.

10. The method of embodiment 8 or 9, wherein the configuration is independently selectable from the set for each time segment or each frequency segment or each time-frequency tile.

11. The method of embodiment 10, wherein one of the following holds: the time segment is a slot or mini-slot; the time segment is a subframe; the time segment is radio frame; the frequency segment is a subcarrier the frequency segment is a frequency band; the time-frequency tile is a resource block 12. The method of any of embodiment 8 to 11, wherein the configuration data is received in semi-static signaling.

13. The method of any of embodiments 8 to 11, wherein the set of configurations is pre-defined in a network specification.

14. The method of embodiment 12 or 13, further comprising receiving first control information indicating the configuration by selecting one configuration in the set of configurations.

15. The method of any of the preceding embodiments, further comprising receiving first control information indicating the configuration.

16. The method of embodiment 14 or 15, wherein the first control information is received in dynamic signaling.

17. The method of any of embodiments 14 to 16, wherein the first control information is specific for an uplink channel or signal or group thereof.

18. The method of embodiment 17, further comprising receiving second control information, wherein the second control information is related to a same time or frequency position as the first control information but is specific to a different uplink channel or signal or group thereof.

19. The method of any of embodiments 8 to 18, wherein the set of configurations is specific to an uplink channel or signal or a group thereof.

20. The method of embodiment 20, wherein a configuration for SRS is different from a configuration for PUSCH.

21. The method of any of the preceding embodiments, wherein the configuration is applicable at least for non-beam-specific uplink power control.

22. The method of any of the preceding embodiments, wherein the configuration is applicable for uplink power control of a wireless device operating in a relatively lower range of its frequency capability.

23. The method of any of the preceding embodiments, wherein the propagation-related quantity is one or more of: path loss relative to the transmission point; a RSRP; a coupling loss; a path loss-related quantity.

24. The method of any of the preceding embodiments, wherein the uplink power setting is derived in accordance with a predefined rule.

25. The method of embodiment 24, wherein the predefined rule further considers one or more of: a configured transmit power of a serving cell; a bandwidth of a transmission resource; a modulation and coding setting; a configured correction value.

26. The method of any of the preceding embodiments, further comprising applying the uplink power setting to an uplink transmission.

27. A wireless device comprising a receiver, a transmitter, processing circuitry and a memory storing instructions executable by the processing circuitry for:
receiving at least one reference signal from a transmission point;
measuring a propagation-related quantity loss on the basis of the at least one reference signal; and
deriving an uplink power setting on the basis of the measured propagation-related quantity,
wherein said receiving of at least one reference signal is performed in accordance with a configuration related to uplink power control.

28. The wireless device of embodiment 27, wherein the memory further comprises instructions for performing the method of any of embodiments 2 to 18.

The wireless device of embodiment 27 or 28, wherein the wireless device is a user equipment.

30. A method implemented in a transmission point, comprising:
transmitting first control information indicating a configuration related to uplink power control of a wireless device to be served by the transmission point; and
transmitting at least one reference signal.

31. The method of embodiment 30, further comprising transmitting configuration data representing a set of configurations.

32. The method of embodiment 31, wherein the set of configurations includes at least one configuration suitable for non-beam-specific uplink power control and at least one configuration suitable for beam-specific uplink power control.

33. The method of any of embodiments 30 to 32, wherein the configuration is independently selectable from the set for each time segment or each frequency segment or each time-frequency tile by a wireless device to be served by the transmission point.

34. The method of embodiment 33, wherein one of the following holds: the time segment is a slot or mini-slot; the frequency segment is a subcarrier; the time-frequency tile is a resource block 35. The method of any of embodiment 30 to 34, wherein the configuration data is transmitted in semi-static signaling.

36. The method of any of embodiments 30 to 35, wherein the first control information indicates the configuration by selecting one configuration in a set of configurations.

37. The method of embodiment 36, wherein the first control information is transmitted in semi-static or dynamic signaling.

38. The method of any of embodiments 30 to 37, wherein the first control information is specific to an uplink channel or signal or group thereof.

39. The method of embodiment 38, further comprising transmitting second control information, wherein the second control information is related to a same time or frequency position as the first control information but is specific to a different uplink channel or signal or group thereof.

40. The method of embodiment 38 or 39, wherein the channel or signal or group thereof is one or more of: PUSCH, PUCCH, PRACH, SRS.

41. The method of any embodiments 31 to 40, wherein the set of configurations is specific to an uplink channel or signal or a group thereof.

42. The method of embodiment 41, wherein a configuration for SRS is different from a configuration for PUSCH.

43. A transmission point comprising a receiver, a transmitter, processing circuitry and a memory storing instructions executable by the processing circuitry for:
transmitting first control information indicating a configuration related to uplink power control of a wireless device to be served by the transmission point; and
transmitting at least one reference signal.

44. The transmission point of embodiment 43, wherein the memory further comprises instructions for performing the method of any of embodiments 30 to 42.

45. The transmission point of embodiment 43 or 44, wherein the transmission point is a base station, such as a gNB.

46. A computer program comprising computer-readable instructions for causing a programmable processor to perform the method of any of embodiments 1 to 26 or any of embodiments 30 to 42.

47. A computer program product comprising a computer-readable medium storing the computer program of embodiment 46.

Although terminology from 3GPP LTE has been used in this disclosure to exemplify the invention, this should not be seen as limiting the scope of the invention to only the aforementioned system. Other wireless systems, especially 5G/NR, WCDMA, WiMax, UMB and GSM, may also benefit from exploiting the ideas covered within this disclosure.

NR terminology and LTE terminology coincide to a considerable extent; for instance, a resource element (RE) remains 1 subcarrier×1 OFDM symbol. Yet some terms known in LTE have been given a new meaning in NR. In this disclosure, including the claims, prefixes "LTE" and "NR" may be used to clarify the relevant technical context. Examples: An LTE subframe lasting 1 ms contains 14 OFDM symbols for normal CP. An NR subframe has a fixed duration of 1 ms and may therefore contain a different number of OFDM symbols for different subcarrier spacings. An LTE slot corresponds to 7 OFDM symbols for normal CP. An NR slot corresponds to 7 or 14 OFDM symbols; at 15 kHz subcarrier spacing, a slot with 7 OFDM symbols occupies 0.5 ms. Reference is made to 3GPP TR 38.802 v14.0.0. Therefore, even though some embodiments of this disclosure have been described using LTE-originated terminology, they remain fully applicable to NR technology.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method implemented in a wireless device, comprising:
   determining configuration data representing a set of configurations;
   receiving at least one reference signal from a transmission point;
   measuring a propagation-related quantity on the basis of the at least one reference signal; and
   deriving an uplink power setting on the basis of the measured propagation-related quantity;
   wherein said receiving of at least one reference signal is performed in accordance with a configuration selected from the set, wherein the configuration is related to uplink power control and is specific to an uplink channel or signal or a group thereof;
   wherein the set of configurations includes at least one configuration suitable for non-beam-specific uplink power control.

2. The method of claim 1, wherein the set of configurations is specific to the uplink channel or signal or group thereof.

3. The method of claim 1, wherein the configuration data indicates a size of a set of reference signals in each configuration.

4. The method of claim 1, wherein the configuration data is received in semi-static signaling.

5. The method of claim 1, further comprising receiving first control information indicating the selected configuration in the set of configurations.

6. The method of claim 5, wherein the first control information is specific for an uplink channel or signal or group thereof.

7. The method of claim 5, wherein the first control information is received in dynamic signaling.

8. The method of claim 5, wherein the first control information is received in semi-static signaling.

9. The method of claim 5, further comprising receiving second control information, wherein the second control information is related to a same time or frequency position as the first control information but is specific to a different uplink channel or signal or group thereof.

10. The method of claim 1, wherein the channel or signal or group thereof is one or more of: physical uplink shared channel (PUSCH), physical uplink control channel (PUCCH), and/or sounding reference signal (SRS).

11. The method of claim 1, wherein the propagation-related quantity is one or more of: path loss relative to the transmission point; a path loss-related quantity.

12. The method of claim 1, wherein the configuration is independently selectable from the set for each time segment or each frequency segment or each time-frequency tile.

13. A computer readable non-transitory storage medium storing a computer program which, when executed on at least one processor, causes the at least one processor to perform the method of claim 1.

14. A computer readable non-transitory storage medium storing a computer program which, when executed on at least one processor, causes the at least one processor to store the computer program of claim 13.

15. A method implemented in a transmission point, comprising:
   transmitting configuration data representing a set of configurations related to uplink power control of a wireless device to be served by the transmission point; and
   transmitting at least one reference signal, wherein
   a configuration is selected from the set of configurations, and
   the configuration is specific to an uplink channel or signal or a group thereof;
   wherein the set of configurations includes at least one configuration suitable for non-beam-specific uplink power control.

16. The method of claim 15, wherein the set of configurations is specific to an uplink channel or signal or group thereof.

17. The method of claim 15, wherein the configuration data indicates a size of a set of reference signals in each configuration.

18. The method of claim 15, wherein the configuration data is transmitted in semi-static signaling.

19. The method of claim 15, further comprising transmitting first control information indicating a selected configuration in the set of configurations.

20. The method of claim 19, wherein the first control information is specific for an uplink channel or signal or group thereof.

21. A computer readable non-transitory storage medium storing a computer program which, when executed on at least one processor, causes the at least one processor to perform the method of claim 15.

22. A computer readable non-transitory storage medium storing a computer program which, when executed on at least one processor, causes the at least one processor to store the computer program of claim 21.

23. A wireless device comprising a receiver, a transmitter, processing circuitry and a memory storing instructions executable by the processing circuitry for:
   determining configuration data representing a set of configurations;
   receiving at least one reference signal from a transmission point;
   measuring a propagation-related quantity on the basis of the at least one reference signal; and
   deriving an uplink power setting on the basis of the measured propagation-related quantity;
   wherein said receiving of at least one reference signal is performed in accordance with a configuration selected from the set, wherein the configuration is related to uplink power control and is specific to an uplink channel or signal or a group thereof;
   wherein the set of configurations includes at least one configuration suitable for non-beam-specific uplink power control.

24. The wireless device of claim 23, wherein the wireless device is a user equipment.

25. A transmission point comprising a receiver, a transmitter, processing circuitry and a memory storing instructions executable by the processing circuitry for:
   transmitting configuration data representing a set of configurations related to uplink power control of a wireless device to be served by the transmission point; and
   transmitting at least one reference signal, wherein
   a configuration is selected from the set of configurations, and
   the configuration is specific to an uplink channel or signal or a group thereof;
   wherein the set of configurations includes at least one configuration suitable for non-beam-specific uplink power control.

26. The transmission point of claim 25, wherein the transmission point is a base station comprising a gNB.

* * * * *